Carpenter et al.

United States Patent [19]

[11] Patent Number: 5,389,139
[45] Date of Patent: Feb. 14, 1995

[54] NITRO-SUBSTITUTED POLYMERIC CORROSION INHIBITORS FOR ALUMINUM FLAKE PIGMENT

[75] Inventors: Clint W. Carpenter, Royal Oak; Jeanne M. De Haan, Southfield, both of Mich.

[73] Assignee: BASF Corporation, Southfield, Mich.

[21] Appl. No.: 195,961

[22] Filed: Feb. 14, 1994

[51] Int. Cl.$^6$ ................................. C09C 1/62
[52] U.S. Cl. ................... 106/404; 106/14.15; 106/14.21; 106/14.37; 106/14.39; 106/14.44; 106/403
[58] Field of Search ............ 106/403, 404, 14.15, 106/14.21, 14.37, 14.39, 14.44

[56] References Cited

U.S. PATENT DOCUMENTS 4,869,754  8/1989  Kawabe et al. ............ 106/404
5,156,677  10/1992  Carpenter et al. ............ 106/404

Primary Examiner—Mark L. Bell
Assistant Examiner—Scott L. Hertzog
Attorney, Agent, or Firm—Anne Gerry Sabourin

[57] ABSTRACT

A compound is described that is useful for metal surface modification, particularly aluminum flake pigment surface modification. The compound is a nitro-substituted polymeric composition. The polymeric compound includes a pigment interactive nitro-containing substituent, a hydrophobic substituent and a terminal hydrophilic substituent. A method for surface modification of a metallic flake pigment with the compound and compositions containing the surface modified metallic flake pigment are also described.

19 Claims, No Drawings

NITRO-SUBSTITUTED POLYMERIC CORROSION INHIBITORS FOR ALUMINUM FLAKE PIGMENT

FIELD OF THE INVENTION

The present invention is related to polymeric compounds useful as a combined corrosion inhibitor and surface modifier for metallic flake pigment. The invention also pertains to coating compositions containing the treated metallic pigments.

BACKGROUND OF THE INVENTION

The present invention relates to compounds that are useful for surface modification and corrosion inhibition of metallic particles, such as metallic flake pigments and in particular aluminum flake pigment. In particular, the invention concerns decorative coatings formed from aqueous compositions containing metallic flake pigments that are surface modified with such compounds.

The use of metallic flake pigments, such as aluminum flake pigments in decorative coatings to give the coating a metallic effect is widespread. The metallic effect is particularly popular with customers in the automotive market, and metallic colors form a large share of automotive paints.

Automotive coatings may utilize a single, uniformly pigmented layer. Alternatively, they may have two distinct layers, a lower, highly pigmented layer and an upper layer with little or no pigmentation. The two-layer coating is known in the industry as basecoat/-clearcoat or color plus clear coat. Basecoat/clearcoat coatings impart a high level of gloss and depth of color that result in a particularly appealing look. Metallic flake pigments may be incorporated to give the coating a metallic effect.

Waterborne automotive paints are gaining widespread usage in the automotive industry due to concerns over organic solvent emissions during application of paints. The new waterborne paints have the disadvantage of using a medium which is corrosive to metallic flake pigments. For example the pH of the waterborne acrylic coating compositions typically ranges from 8.0–9.0, and the polyurethane coating compositions have a pH typically ranging from 7.5 to 8.0. In a basic pH environment, the aluminum pigment is oxidized. The oxidation is a form of corrosion which destroys the metallic pigmentation properties of the mirror-like particles. When a paint with oxidized metallic flake pigments is coated onto a substrate, the coating shows discoloration and diminished metallic effect.

Furthermore, oxidation of the metallic surfaces by water results in the evolution of hydrogen gas. The amount of hydrogen gas evolved is indicative of the amount of oxidation (i.e. corrosion) of the metallic pigment. The hydrogen gas may accumulate in the paint.

Deterioration of aluminum pigment may accelerate over time due to continuous contact with the basic pH environment of the coating composition. Coating compositions containing metal flake pigment are often stored for 6 months or more before application, which can result in significant corrosion of the pigment. If this corrosion remains unchecked the coating composition may be unusable.

Considerable work has been done in the industry to try to protect the metal surfaces from water in the waterborne coating compositions. The pigments may be made corrosion resistant by treatment with transition metal salts, rare earth metal salts or mixtures thereof, as disclosed in U.S. patent applications having Ser. No. 07/982,355 and 07/982,352.

In addition, the pigments may be treated with silane or phosphorus substituted polymeric compounds, as taught by U.S. Pat. No. 5,156,677 to Carpenter et al.

It has been discovered that metallic flake pigments that are surface modified with the compounds of the present invention are particularly resistant to oxidation in waterborne paints with minimal discoloration or diminution of the metallic effect in the coating. It has also been discovered that metallic flake pigments surface modified according to the present invention form superior dispersions in water in comparison to metallic flake pigments using previously known surface treatments. This superior dispersion in the waterborne paint composition results in a coating with an enhanced metallic effect.

SUMMARY OF THE INVENTION

The present invention provides a compound useful for surface modification of metallic flake pigment. The compound has the formula:

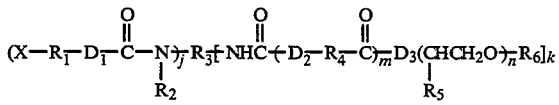

where X is $NO_2$ and wherein $R_1$ is an alkyl, aryl or alkylaryl group. $D_1$ is either a divalent radical selected from the group consisting of —O—, —$NA_4$, and —S—, or a trivalent radical of the formula

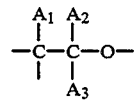

wherein $A_1$, $A_2$, $A_3$ and $A_4$ are each independently hydrogen or alkyl of one to twelve carbon atoms. $R_2$ is hydrogen or a covalent bond with $D_1$ when $D_1$ is a trivalent radical. $R_3$ is a polymeric backbone. The term "polymeric" is meant to include oligomeric groups also. $D_2$ and $D_3$ are divalent radicals, each independently —O— or —$NA_5$—, where $A_5$ is hydrogen or alkyl of one to twelve carbon atoms. $R_4$ is a divalent radical selected from straight or branched alkylenes of three to thirty carbon atoms. The segment represented by ($D_2R_4C(=O)$—) is therefore either polyester or polyamide and has a degree of polymerization of m, m being an integer of one to one thousand. $R_5$ is hydrogen or a mixture of hydrogen and alkyl of one to eight carbon atoms. That part of the molecule represented by ($CH(R_5)CH_2O$—)$_n$ is therefore either polyethylene oxide or a polyethylene oxide/polyalkylene oxide copolymer having a degree of polymerization n, n being an integer from one to one thousand. $R_6$ is alkyl of one to thirty carbon atoms. The numbers of substitutions of each kind on the polymeric backbone are represented by j and k, where j and k are integers, each independently being one to fifty.

Another aspect of the present invention provides for a metallic flake pigment surface modified with at least one compound as described above. The metal may have aluminum, gold bronze (copper-zinc alloys), copper, nickel, magnesium, zinc, and alloys of these. The metallic flake pigment surface modified with the compound of the invention experiences improved stability in aqueous environments and a retarded rate of oxidation when compared to metallic flake pigment without surface modification. The compound of the invention also improves dispersion of metallic flake pigments in aqueous compositions. The terms "surface modification" and "surface modified" encompass any and all associations, interactions, or reactions between the metallic surface and the compound in accordance with the disclosed invention.

Another aspect of the invention provides for a composition having a polymeric network containing a residue of the compound described hereinabove. Such a polymeric network is formed through the reactions of species having more than one reactive group, such as polymers and crosslinkers well known to the art, and the compound, when the compound contains a group reactive with at least one of the species, said group forming a covalent bond to become part of the polymeric network, The part of the polymeric network originally contained in the compound is termed a residue of the compound. Preferably, the composition also contains a metallic flake pigment surface modified with the compound as described hereinabove.

The invention also provides for a coated article. The coated article is a substrate with a coating thereon. The coating on the substrate may contain the metallic flake pigment surface modified with any one or more of the compounds described above, or a composition containing a metallic flake pigment that has been surface modified with the compound and a polymeric network containing a residue of the compound.

The present invention further includes a method for surface modification of a metallic flake pigment and a method for making an aqueous coating composition.

The compounds of the present invention are particularly useful for modification of metallic surfaces. Metallic flake pigment surface modified with at least one compound according to the invention has improved dispersibility in aqueous compositions.

The present invention provides an effective method for surface modification of a metallic flake pigment with a compound according to the invention, and for making an aqueous composition containing the metallic flake pigment surface modified with the compound and a water-compatible polymer.

The present invention also provides a coated article that is a coating on a substrate, wherein the coating contains a metallic flake pigment surface modified with at least one compound according to the invention, or a polymeric network containing a residue of at least one compound according to the invention.

DETAILED DESCRIPTION OF THE INVENTION

The compounds that have been found to be useful for metal surface modification are of the formula:

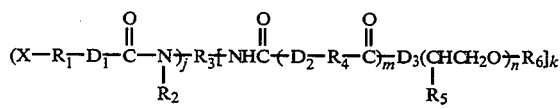

The compounds have a polymeric backbone $R_3$, having at least two different substituents. The first substituent contains the $NO_2$— functionality. The second substituent has a hydrophobic portion, represented by $(D_2R_4C(=O)—)_m$, and a terminal hydrophilic portion, represented by That part of the molecule represented by $(CH(R_5)CH_2O—)_nR_6]_k$. The first substituent is linked to the polymeric backbone via the linking group —C(=O)—$NR_2$—. The second substituent is linked to the polymeric backbone via the linking group —C(=O)—NH—.

The polymeric backbone, $R_3$, may be, for example, an acrylic, urethane, polyester, alkyd or epoxy polymer or oligomer. Acrylic and urethane backbones are preferred. The polymeric backbone when synthesized includes thereon at least two isocyanate groups or latent isocyanate groups. This may be accomplished by either copolymerizing into the polymeric backbone a monomer with isocyanate or latent isocyanate functionality, or by reacting a group with isocyanate or latent isocyanate functionality onto the polymer. The reaction of the isocyanate or latent isocyanate functionality with an isocyanate-reactive functionality of the first substituent or the second substituent forms the appropriate linking group.

Illustrative examples of isocyanate or latent isocyanate functional urethane backbones are urethane polymers with terminal isocyanate or latent isocyanate functionality. The urethane polymers may be synthesized by known techniques, such as bulk polymerization or, preferably, solution polymerization, from polyisocyanates and polyfunctional compounds reactive with polyisocyanates, including, for example, polyols, polyamines, and amino alcohols; with the proviso that the sum of equivalents of isocyanate and latent isocyanate groups used exceeds the equivalents used of polyfunctional compounds reactive with polyisocyanates. The polyisocyanate may be, for example, isophorone diisocyanate, p-phenylene diisocyanate, biphenyl 4, 4' diisocyanate, meta-xylylene diisocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis-[2-((isocyanato)propyl]benzene (also known as tetramethylxylyldiisocyanate, TMXDI) methylene bis-(phenyl isocyanate), 1,5-naphthalene diisocyanate, bis-(isocyanatoethyl fumarate), methylene bis-(4-cyclohexyl isocyanate), and biurets or isocyanurates of any of these.

The polyfunctional compounds reactive with polyisocyanates may include any of diols, triols, or alcohols of higher functionality, such as ethylene glycol, propylene glycol, 1,4-butanediol, 1,6-hexanediol, neopentyl glycol, trimethylolethane, trimethylolpropane, pentaerythritol, polyester polyols, polyether polyols, and the like; polyamines, such as ethylene diamine and diethylene triamine; or amino alcohols, such as diethanolamine and ethanolamine.

Preferably, one of either the polyisocyanate or the polyfunctional compound reactive with polyisocyanate has functionality (including latent functionality) greater than two. The reactants are apportioned so that the polyurethane copolymer has terminal isocyanate functionality and a weight average molecular weight preferably of at least 1000, and more preferably from 1000 to 20,000. The weight average molecular weight is determined by gel permeation chromatography using polystyrene standards.

Illustrative examples of isocyanate or latent isocyanate functional acrylics are copolymers of an ethylenically unsaturated monomer containing an isocyanate or latent isocyanate group. The copolymers may be prepared by using conventional techniques, such as free radical polymerization cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

In a particularly preferred embodiment, the ethylenically unsaturated monomer containing an isocyanate group is meta-isopropenyl-$\alpha,\alpha$-dimethylbenzyl isocyanate. Meta-isopropenyl-$\alpha,\alpha$-dimethylbenzyl isocyanate is available from American Cyanamid Company, Wayne, N.J. under the trade name "TMI(Meta) unsaturated aliphatic isocyanate," and is described in American Cyanamid Company's publication "TMI ® (Meta) unsaturated aliphatic isocyanate", publication number 2-849 1/88. Other copolymerizable monomers can be acrylonitrile, acrylic or methacrylic acid, alkyl esters of acrylic or methacrylic acid, e.g., ethyl acrylate, butyl acrylate, 2-ethylhexyl acrylate, methyl methacrylate, butyl methacrylate, propyl methacrylate, lauryl methacrylate, 2-ethylhexyl methacrylate, and the like; and vinyl monomers, such as styrene, vinyl toluene, maleic anhydride, vinyl propionate, and the like. The choice of monomers is not critical, so long as no monomer contains a group reactive with the isocyanate group.

The polymerization reaction may be, for example, a free radical polymerization carried out in solution using such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents. Preferred solvents are ketones. Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n- or tertdodecyl mercaptan, thiosalicylic acid, mercaptoacetic acid, and mercaptoethanol; halogenated compounds, and dimeric alpha-methyl styrene.

The free radical polymerization is usually carried out at temperatures from about 20° C. to about 200° C., preferably from 120° C. to 160° C. Generally, the amount of meta-isopropenyl-$\alpha,\alpha$-dimethylbenzyl isocyanate that may be incorporated into the addition polymer increases with increasing reaction temperature. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

The solvent or solvent mixture is generally heated to the reaction temperature and the monomers and initiator(s) are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed to ensure complete conversion. The acrylic copolymer preferably has a weight average molecular weight of at least 1000, and more preferably from 2000 to 50,000. The weight average molecular weight is determined by gel permeation chromatography using polystyrene standards.

The isocyanate-functional polymeric backbone is adducted with both the first substituent, attached via the linking group —C(=O)—NR$_2$—, and the second substituent, attached via the linking group —C(=O)—NH—. The number of first substituents attached via the linking group —C(=O)—NR$_2$— is represented in the formula hereinabove by j, where j is an integer from one to fifty. Preferably, j is an integer from 1 to 20; more preferably, j is an integer from 1 to 10. An amount of the first substituent is included sufficient to firmly anchor the polymer to the surface of the pigment. This amount is dependent on factors such as the size and nature of the metallic particle, and can readily be determined by one skilled in the art.

The number of second substituents attached via the the linking group —C(=O)—NH— is represented in the formula hereinabove by k, where k is an integer from one to fifty. Preferably, k is an integer from 1 to 20; more preferably, k is an integer from 1 to 10. The amount of the second substituent present is chosen to optimize the dispersibility and gassing resistance of the treated flake.

The first substituent X is a nitro (NO$_2$) group. The nitro substituent is formed by reacting the nitro-containing material with isocyanate groups on the polymer backbone. Examples of such materials useful for forming the substituents compatible with the above-mentioned requirements are any nitro-containing compound including as an isocyanate reactive group such as hydroxy, amino, mercapto or oxirane. Useful nitro-containing compounds include alkyl, aryl or alkylaryl substituted compounds including an isocyanate reactive group. Particularly preferred compounds for purposes of the present invention include 2-methyl-2-nitro propanol, 2-nitro-1-propanol, 2-nitroethanol, 4-nitroaniline, 2-nitrobenzyl alcohol and 4-nitrothio phenol.

When the isocyanate-reactive groups on the nitro-containing material are reacted with the isocyanate or latent isocyanate groups on the polymer backbone, R$_1$ represents the alkyl, aryl or alkylaryl portion of the nitro-containing material and the isocyanate-reactive groups are converted by the reaction to the radical D$_1$, The isocyanate or latent isocyanate groups are converted to the linking group —C(=O)—NR$_2$—. A hydroxyl isocyanate-reactive group forms —O— as the radical D$_1$ and —C(=O)—NH— as the linking group. An amino isocyanate-reactive group forms —NA$_4$— as the radical D$_1$ and —C(=O)—NH— as the linking group. A mercapto isocyanate-reactive group forms —S— as the radical D$_1$ and —C(=O)—NH— as the linking group. An oxirane

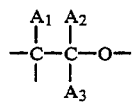

isocyanate-reactive group forms as the radical D$_1$ and

as the linking group, the two together forming the moiety

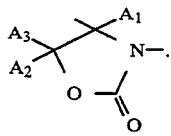

The second substituent, represented in the formula hereinabove by $(D_2R_4C(=O)—)_mD_3(CH(R_5)CH_2O—)_nR_6$, is a structure having both a polyester or polyamide residue ($D_2$ being —O— or —$NA_5$—, respectively) and an alkoxy poly(oxyalkylene) alcohol or alkoxy poly(oxyalkylene) amine residue ($D_3$ being —O— or —$NA_6$—, respectively). The second substituent is linked to the polymeric backbone through the linking group —C(=O)—NH—. The linking group is formed by the reaction of an isocyanate group on the polymeric backbone with D2. The second substituent may be formed by the reaction of a lactone, lactam, amino acid, or hydroxy acid, or a polymer formed using any of these, with an alkoxy poly(oxyalkylene) alcohol or with an alkoxy poly(oxyalkylene) amine. The polyester or polyamide residue, represented by $(D_2R_4C(=O)—)$, has a degree of polymerization of m, m being an integer from one to one thousand. It is preferred that m be from 10 to 200. In a particularly preferred embodiment m is from 20 to 50. $R_4$ is a divalent radical selected from straight or branched alkylenes of three to thirty carbon atoms. Preferably, $R_4$ has three to twenty carbon atoms. In a more preferred embodiment $R_4$ is a straight chain alkylene of five carbon atoms.

The second substituent may be formed by polymerizing, for example, ε-caprolactone onto an alkoxy poly(oxyalkylene) alcohol. In a particularly preferred embodiment, one equivalent of the alkoxy poly(oxyalkylene) alcohol is reacted with from 20 to 50 equivalents of ε-caprolactone. The polymerization temperatures are typically between 100° C. and 150° C. Any of a number of catalysts known to be useful in esterification reactions may be utilized, such as tetrabutyl titanate or titanium diisopropoxide-bis(2,4-pentanedionate). For example, tetrabutyl titanate may be used advantageously at levels of from 0.05% to 0.5%, based on weight of reactants. The reaction may be done in the presence or absence of solvent. Substituents using lactams, such as caprolactam, hydroxy acids, such as 12-hydroxystearic acid, or amino acids, such as 12-aminododecanoic acid, may be prepared in a similar manner using methods well-known to the art.

The alkoxy poly(oxyalkylene) alcohol or alkoxy poly(oxyalkylene) amine employed can be formed by the alkoxyl-initiated polymerization of ethylene oxide or mixtures of ethylene oxide with other epoxides of up to ten carbon atoms, such as propylene oxide or butylene oxide. $R_5$ is thus either hydrogen or a mixture of hydrogen and alkyls of one to eight carbon atoms. It is particularly advantageous for $R_5$ to be either hydrogen or a mixture of hydrogen and alkyls of one to three carbon atoms. The polymerization may be terminated by addition of an aziridine, such as propylene aziridine, to form the alkoxy poly(oxyalkylene) amine. The residue of the alkoxy poly(oxyalkylene) alcohol or amine contained in the compound, represented by $D_3(CH(R_5)CH_2O—)_nR_6$, is either alkoxy polyoxyethylene or an alkoxy polyoxyethylene/polyoxyalkylene copolymer, having a degree of polymerization of n, n being an integer from one to one thousand. Preferably, n is an integer from 20 to 200; more preferably, from 40 to 70. $R_6$ is an alkyl of one to thirty carbon atoms. $R_6$ is preferably an alkyl of one to ten carbon atoms. In a particularly preferred embodiment $R_5$ is hydrogen and $R_6$ is methyl.

The order in which the first and second substituents are reacted onto the polymeric backbone is not critical, and, in general, whether the two substituents are added simultaneously or sequentially will depend upon the particular functionalities chosen. In the case of latent isocyanate groups, such as blocked isocyanate groups, the conditions must allow the generation of the isocyanate functionality. The reactions of forming the first and second substituents and adducting them onto the polymeric backbone may be done neat or in solution. Addition of an inert solvent is preferred when the viscosity would otherwise be too high to achieve adequate mixing. Solvents containing hydroxyl groups and other active hydrogens are not preferred. Useful solvents include aromatic and aliphatic hydrocarbons, esters, ethers, and ketones. Such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents may be useful.

The nitro containing compound of the present invention is utilized in an amount between 1.0 and 25.0% by weight, based on total pigment weight. Preferably, the nitro containing compound is utilized in an amount between 10.0 and 15.0 percent by weight based on total pigment weight.

In one embodiment the nitro containing compound of the present invention is used in combination with a rare earth metal salt for treating the metal pigment. Particularly preferred salts for this purpose include acetates, nitrates and chlorides of rare earth metals. These compounds are disclosed in U.S. patent application Ser. Nos. 07/982,355, and 07/982,352 the contents of which are hereby incorporated by reference. Use of the two compounds together are thought to be beneficial because of different modes of interaction with metal surfaces. When used in combination, the nitro-containing compound is utilized in an amount between 5.0 and 25% by weight and the metal salt is utilized in an amount between 0.05% and 10% based on total pigment weight. Preferably, the nitro-containing compound is utilized in an amount between 10.0% and 15.0% by weight and the metal salt is utilized in an amount between 0.1% and 5.0% by weight, all weights being based on percentages of the total pigment weight.

In an alternative embodiment the nitro-containing material is utilized in combination with a phosphate ester as disclosed in U.S. Pat. No. 5,156,677 to Carpenter et al., the content of which is hereby incorporated by reference. The phosphorus compound is represented by the formula

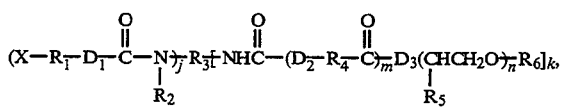

where X is

where $A_7$ is alkyl of 1 to 10 carbon atoms, hydroxy, alkoxy of one to ten carbon atoms, alkoxyalkoxy of two to ten carbon atoms and alkanoyloxy of two to ten carbon atoms, or halogen. $R_1$ is a divalent radical selected from straight or branched alkylenes of one to twelve carbon atoms. $D_1$ is either a divalent radical selected from the group consisting of —O—, —NA$_4$, and —S—, or a trivalent radical of the formula

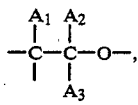

wherein $A_1$, $A_2$, $A_3$ and $A_4$ are each independently hydrogen or alkyl of one to twelve carbon atoms. $R_2$ is hydrogen or a covalent bond with $D_1$, with the proviso that $R_2$ is only a covalent bond with $D_1$, when $D_1$ is a trivalent radical. $R_3$ is a polymeric backbone. $D_2$ and $D_3$ are divalent radicals, each independently —O— or —NA$_5$—, where $A_5$ is hydrogen or alkyl of one to twelve carbon atoms. $R_4$ is a divalent radical selected from straight or branched alkylenes of three to thirty carbon atoms. $R_5$ is hydrogen or a mixture of hydrogen and alkyl of one to eight carbon atoms; $R_6$ is alkyl of one to thirty carbon atoms, m and n are integers, each independently being one to one thousand, and j and k are integers, each independently being one to fifty. When used in combination, the phosphate containing compounds may be used at levels from 0.5% to 10% and the nitro-containing compound at levels of 0.5 to 25% each, based on the weight of the metallic flake pigment; but it has been found that from 0.5 to 5.0% of the phosphorus compound and 10 to 15% of the nitro-containing compound (based on the weight of the metallic flake pigment) is particularly useful for treating metallic flake pigment.

The compound of the invention is used to modify the surface of metallic particles for use in aqueous coating compositions, particularly waterborne basecoat compositions. The metallic particles may be aluminum, gold bronze (copper-zinc alloys), copper, nickel, brass, magnesium, zinc, and alloys of these. Preferably, the metallic particles are aluminum, gold bronze, brass, and zinc. Aluminum is particularly preferred.

Aluminum particles as contemplated for use with the invention generally have a surface area that may range from about 0.05 to about 15 $m^2/g$ of aluminum. The aluminum particles that are specifically contemplated as preferred aspects of the invention are aluminum flakes, powders and granules. Aluminum flake pigments are particularly preferred in the waterborne basecoat compositions. In a preferred aspect, the surface area of the aluminum is from about 2 to about 14.5 $m^2/g$. The average particle size of the aluminum flake pigment is preferably from 1 to 70 microns, more preferably from 5 to 50 microns.

Commercial aluminum flake pigment pastes are available from companies such as Silberline, Tamaqua, Pa.; Aluminum Company of America, Pittsburgh, Pa.; Obron Atlantic Corp., Painesville, Ohio; Reynolds Metals Company, Richmond, Va.; and Toyo Aluminum KK, Higashiku, Osaka, Japan in various grades, types and particle sizes. For certain waterborne paint applications, such as automotive basecoats, non-leafing aluminum flake pigments, such as Sparkle Silver ® 5245 AR aluminum paste from Silberline or 8160 AR aluminum paste from Obron, have been utilized.

To form a waterborne paint composition, the surface-modified metallic flake pigment may be combined with a film-forming resin and water. Ingredients may also be included, such as crosslinkers and other resins; plasticizers; additional cosolvents to aid in stabilization or application of the composition; rheology control agents; other pigments; UV light stabilizers and antioxidants; catalysts; fungicides; and other ingredients well known in the art to be useful in such compositions.

Suitable film-forming resins are water-dispersible or water-soluble ionic or nonionic resins. Anionic or nonionic resins are preferred for use in topcoat applications. The resins may be acrylic, vinyl, polyurethane, polyester, alkyd, epoxy, or other polymers known to be useful in films. Examples of water-dispersible polymers used for topcoats are contained in U.S. Pat. Nos. 4,794,147; 4,791,168; and 4,518,724, all of which are incorporated herein by reference. Such systems typically also include a crosslinker, such as aminoplast resins, polyamines, blocked polyisocyanates, and so on, depending on the functionality available for crosslinking on the film forming resin. For example, hydroxyl-functional acrylic or polyurethane resins can be cured using aminoplast resins. For this purpose, melamine-formaldehyde resins are particularly preferred. Melamine-formaldehyde resins of the kind contemplated are commercially available from, for example, Monsanto Co., St. Louis, Mo.; and American Cyanamid, Wayne, N.J. A polymeric-type melamine may be used, particularly when the film forming resin is anionically stabilized. Such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

The film-forming resin or the crosslinker may comprise functionality that can react with a reactive group on the compound of the invention during the curing step. The polymeric network formed during cure would then include a residue of the compound, covalently bonded to the polymeric network. The ability of the compound to react during the curing step is independent of its function in surface modifying the metallic flake pigment.

Additional cosolvents may be added to aid in stabilization or application of the composition. The more preferred solvents are acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred.

Other pigments, if used, are preferably incorporated as pastes or dispersions prepared by using grinding resins or pigment dispersants according to methods well known in the art. The term "pigments" is meant to encompass organic and inorganic compounds that are colored materials, fillers, flake materials, and other materials of kind that the art normally names as pigments. If pigments other than the surface modified metallic flake pigment are included, they are usually used in an amount of 1% to 200%, based on the total solid weight of the reactants. The surface-modified metallic flake pigments used according to the invention are typically used at amounts of 1% to 30%, based on the total solid weight of the reactants.

It may be desirable to include small amounts of rheology control agents, for example fumed silicas, hectorite clays, bentonite clays, or cellulosics like cellulose acetate butyrate. Such materials are usually used at levels of less than 10% based on the total solid weight of reactants. Rheology control agents are used to control the flow and leveling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

The prepared coating composition is applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 62 siphon spray gun (available from Binks Manufacturing Corp., Franklin Park, Ill.) with 50–80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited to use over primed automotive substrates as topcoat formulations or basecoat formulations that are overcoated with clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°–150° C. for 20 to 30 minutes. The thickness of the cured coating can be from 1 to 150 microns, but when used as an automotive topcoat or basecoat the coating thickness is generally from 10 to 70 microns.

In a preferred embodiment of the invention, the coating composition of the present invention is used as a basecoat and is overcoated with a transparent topcoat layer, known commonly in the art as a clearcoat. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat may be a coating composition according to this invention or another composition known to the art to have utility as a clearcoat. The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1–20 minutes. The uncured coatings are then cured, usually by thermoset methods as described hereinabove. The resulting appearance and physical properties are excellent.

The following examples are provided to further illustrate the invention.

Examples

Example 1

Preparation of Nitro-functional Polymer

Part A. Synthesis of Polymeric Backbone

A reactor equipped with a thermocouple, an add funnel, and condenser with a drying tube was charged with methyl amyl ketone and heated to reflux. A mixture of

| | |
|---|---|
| butyl methacrylate | 1015.8 grams |
| n-butyl acrylate | 915.3 grams |
| styrene | 599.2 grams |
| Meta-isopropenyl-α,α-dimethylbenzyl isocyanate | 1717.5 grams |
| t-butyl peroxyacetate | 424.7 grams | was added over 2½ hours, all the while retaining the reactor contents at reflux. The reflux temperature at the end of the add was 168° C. and the reflux was held for another half hour. A mixture of 212.4 grams t-butyl peroxyacetate (50% solution in aromatic solvent) and 335.0 grams methyl amyl ketone was added over a half hour period. Following this addition, the reaction was held at reflux for 1 and ½ hours.

Part B. Synthesis of the Polyester/Polyether Substituent

A reactor was charged with 1500.0 grams methoxy polyethylene glycol (molecular weight 2000, from BASF Corp., Wyandotte, Mich.) and 3000.0 grams ε-caprolactone and 1.0 gram phosphoric acid. The mixture was heated to 140° C. and held at this temperature for about 4 hours.

Part C. Synthesis of Nitro-functional Compound

A reactor was charged with 193.8 grams of the polymeric backbone from part A and 141.6 grams of the polyester/polyether substituent from part B. The contents of the reactor were heated to 120° C. and 0.05 grams of dibutyl tin dilaurate in methyl propyl ketone were added. The contents of the flask were further heated to 120° C. and held for 2 and ½ hours. The isocyanate content measured 0.556 meq/gram. The reaction mixture was cooled to 81° C. and 11.9 grams ethanol amine were added. When the temperature reached 69° C. 111.5 grams propylene glycol methyl ether acetate was added.

Example 2

Preparation of Nitro-functional Polymer 2

Part A. Synthesis of Polymeric Backbone

A reactor equipped with a thermocouple, an add funnel, and a condenser with a drying tube was charged with 150.0 grams xylene and heated to reflux. A mixture of

| | |
|---|---|
| lauryl methacrylate | 252.2 grams |
| n-butyl acrylate | 127.0 grams |
| styrene | 77.6 grams |
| meta-isopropenyl-α,α-dimethyl benzyl isocyanate (TMI ®) | 1717.5 grams |
| t-butyl peroxyacetate | 65.5 grams | was added over 3½ hours, all the while retaining the reactor contents at reflux. Following this, 33.7 grams t-butyl peroxyacetate (50% solution in aromatic solvent) was added over a 15 minute period. Following this addition, the reaction was held at reflux for 1 and ½ hours and then cooled to room temperature. The final product had a measured solids content of 77.4% and a measured isocyanate content of 1.0 meq/gram.

Part B. Synthesis of the Polyester/Polyether Substituent

A reactor was charged with 260.7 grams methoxy polyethylene glycol (molecular weight 2000, from BASF Corp., Wyandotte, Mich.) and 521.2 grams ε-caprolactone and 1.7 ml phosphoric acid. The mixture was heated to 150° C. and held at this temperature for about 8 hours.

Part C. Synthesis of Nitro-functional Compound

A reactor was charged with 100.0 grams of the polymeric backbone from part A and 77.4 grams of the polyester/polyether substituent from part B, 7.1 grams 2-methyl-2-nitro-1-propanol and one drop of dibutyl tin dilaurate in methyl propyl ketone were added. The contents of the reactor were heated to 140° C. When reaction of the isocyanate was complete, the reaction mixture was cooled to 90° C. and 2.0 grams ethanolamine were added. Following exotherm, the reaction cooled and 75.0 grams propylene glycol methyl ether acetate were added.

EXAMPLE 3

Treatment of Aluminum with 10% Nitro-functional Resin 8.0 grams of the nitro-functional resin of Example 2 were combined with 84 grams of propylene glycol methyl ether acetate and heated to 40° C. 76.9 grams of bare aluminum pigment were added to the resin with stirring for 15 minutes. The pigment was then tested for gassing.

EXAMPLE 4

Treatment of Aluminum with 15% Nitro-functional Resin 12.0 grams of the nitro-functional resin of Example 2 were combined with 80.0 grams of propylene glycol methyl ether acetate and heated to 40° C. 76.9 grams of bare aluminum pigment were added to the resin with stirring for 15 minutes. The pigment was then tested for gassing.

EXAMPLE 5

Treatment of Aluminum Pigment with Resin from Ex. 2 and Cerium Acetate 8.0 grams of the nitro-functional resin of Example 2 were combined with 80.4 grams of propylene glycol methyl ether acetate and 251 mg cerium acetate. The mixture was warmed to 40° C. and 76.9 grams of bare aluminum pigment were added to the resin with stirring for 15 minutes. The pigment was then tested for gassing.

EXAMPLE 6

Treatment of Aluminum Pigment with Resin from Ex. 3 and Phosphate Ester 8.0 grams of the nitro-functional resin of Example 3 were combined with 80.0 grams of propylene glycol methyl ether acetate and 2.8 grams phosphate ester as described in U.S. Pat. No. 5,156,677 and the mixture was heated to 40° C. 76.9 grams of bare aluminum pigment were added to the resin with stirring for 15 minutes. The pigment was then tested for gassing.

EXAMPLE 7

Gassing Results for Treated and Untreated Pigment

The test was conducted by adding 0.5 grams of Aluminum pigment into a gassing jar with 10 grams of butyl cellosolve and 100 grams of 0.01N borax solution. The mixture was warmed to 53° C. and monitored. The results are set forth in Tables 1 and 2.

TABLE 1

| | Gassing Results for Treated Pigment | | | | | |
|---|---|---|---|---|---|---|
| | Gassing Per hour | | | | | |
| Pigment | .5 hr | 1 hr | 1.22 | 1.33 | 1.66 | 2.0 |
| Chromated Al (control) | 2.0 | 2.0 | — | 2.0 | 4.0 | 4.0 |
| Bare Al (control) | 18.0 | 90 | — | — | — | — |
| Al from Ex. 3 | 4.0 | 17 | — | 38 | — | — |
| Al from Ex. 4 | 4.0 | 8 | — | 17 | 30 | — |
| Al from Ex. 5 | 4.0 | 24 | 40 | — | — | — |
| Al from Ex. 6 | 1.0 | 2 | — | 4.0 | 8.0 | 16 |

TABLE 2

| | Gassing Results for Pigment | | | | | | |
|---|---|---|---|---|---|---|---|
| | Gassing Per Hour | | | | | | |
| Pigment | .5 hr | 1 hr | 1.3 | 1.5 | 2.0 | 2.5 | 3.5 |
| Chromated Al (control) | 2 | 2 | — | 2 | 2 | 2 | 2 |
| Bare Al (control) | 19 | 82 | 140 | — | — | — | — |
| Al from Ex. 3 | 6 | 12 | — | 36 | — | — | — |
| Al from Ex. 4 | 3 | 4 | — | 10 | 20 | 36 | — |
| Al from Ex. 5 | 6 | 13 | — | 38 | — | — | — |
| Al from Ex. 6 | 2 | 2 | — | 2 | 4 | 7 | 20 |

EXAMPLE 8A

Coating Composition Containing Treated Aluminum Pigment From Ex. 5

111.1 grams melamine resin (Cymel ® 327, from American Cyanamid, Wayne, N.J.) and 27.8 grams butyl cellosolve were premixed and added, with agitation, to 727.2 grams of a thickener which was an aqueous solution of 2.5% laponite in 0.5% Pluracol 1010, obtained from BASF Corp., Wyandotte, Mich. The mixture was blended well for five minutes and then 1136.4 grams anionic polyurethane resin (26% aqueous dispersion) prepared according to methods described in U.S. Pat. No. 4,791,168 was added and mixed for 15 minutes. 1.0 gram surfactant (Surfynol ® 104 BC, 50% surfynol and 50% butyl cellosolve)was added to the mixture. The viscosity of the resin was approximately 10,000 centipoise.

13.70 grams of a branched polyester resin, 28.6 grams of treated pigment prepared according to Ex. 5 and 5.90 grams dimethylethanolamine were mixed. The branched polyester was prepared according to the methods described in U.S. Pat. No. 4,791,168. The branched polyester was 70% nonvolatiles in a mixture of butanol and ethylene glycol monobutyl ether. The aluminum slurry mixture was then added to 200.3 grams of the above described polyurethane mixture under agitation. The pH was adjusted to 7.7 with dimethylethanolamine. Deionized water was added to adjust the final viscosity.

EXAMPLE 8B

Coating Composition Containing Treated Aluminum Pigment From Ex. 3

The polyurethane resin was prepared as above. 29.94 grams of the aluminum pigment treated according to example 3 was combined with 13.70 grams of the polyester resin and dimethylethanolamine as described above. The pigment and resin mixture were added to 200.3 grams of the polyurethane resin. pH and viscosity were adjusted as described in Ex. 8A. 0.25 grams of cerium acetate was added to the final composition.

EXAMPLE 8C

Control Coating Composition

The coating composition was prepared as set forth in Ex. 8A, except the pigment utilized was chromated aluminum not treated with any surface treatment composition.

EXAMPLE 8D

Control Coating Composition

The coating composition was prepared as set forth in Ex. 8A, except the pigment utilized was bare aluminum not treated with any surface treatment composition.

EXAMPLE 9

Gassing Tests for Coating Compositions

The coating compositions were tested for gassing in a gassing apparatus which is a 250 ml gas washing bottle attached to a bubble counter with two chambers. The lower chamber is filled with water, through the side neck of the bubble counter. Hydrogen gas formed by oxidation of aluminum and water, presses water from the lower chamber into the upper chamber of the bubble counter. The volume of water displaced from the lower chamber equals the volume of hydrogen gas generated. The coating composition was tested for gassing by placing a 250 ml sample of enamel containing aluminum flakes into the gas washing bottle. The assembled apparatus containing the flakes is placed in a 40° C. bath and allowed to equilibrate for 60 minutes. After allowing for equilibration, the screw cap is tightened securely. The sample is tested in the 40° C. water bath at 24 hour intervals to measure the amount of hydrogen gas generated.

TABLE 3

| Gassing Results for Coating Compositions | | | | | |
|---|---|---|---|---|---|
| | GASSING PER NUMBER OF DAYS | | | | |
| EXAMPLE | DAY 2 | DAY 6 | DAY 14 | DAY 21 | DAY 25 |
| EX. 8A | 2 | 8 | 16 | 34 | 40 |
| EX. 8B | 4 | 11 | 24 | 56 | 60 |
| Ex. 8C | 2 | 2 | 3 | 9 | 9 |
| Ex. 8D | >24 | — | — | — | — |

We claim:

1. A composition, comprising a metal surface modified with at least one compound, wherein the compound is of the formula

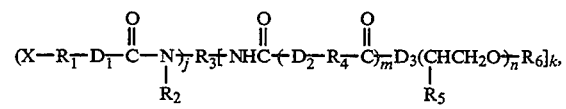

where X is $NO_2$ and wherein $R_1$ is an alkyl, aryl or alkylaryl group;

$D_1$ is either a divalent radical selected from the group consisting of —O—, —$NA_4$—, and —S—, or a trivalent radical of the formula

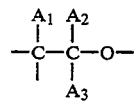

wherein $A_1$, $A_2$, $A_3$ and $A_4$ are each independently hydrogen or alkyl of one to twelve carbon atoms;

$R_2$ is hydrogen or a covalent bond with $D_1$, with the proviso that $R_2$ is only a covalent bond with $D_1$ when $D_1$ is a trivalent radical;

$R_3$ is a polymeric backbone; $D_2$ and $D_3$ are divalent radicals, each independently —O— or —$NA_5$—, where $A_5$ is hydrogen or alkyl of one to twelve carbon atoms;

$R_4$ is a divalent radical selected from straight or branched alkylenes of three to thirty carbon atoms;

$R_5$ is hydrogen or a mixture of hydrogen and alkyl of one to eight carbon atoms;

$R_6$ is alkyl of one to thirty carbon atoms; m and n are integers, each independently being one to one thousand, and j and k are integers, each independently being one to fifty.

2. A composition according to claim 1, wherein the metal is a metallic flake pigment.

3. A composition according to claim 2, further comprising organic solvent.

4. A composition according to claim 2, further comprising water.

5. A composition according to claim 2, wherein the metallic flake pigment is an aluminum flake pigment.

6. A composition according to claim 5, further comprising modifying the surface of aluminum flake pigment with an additional compound selected from the group consisting of salts of transition and rare earth metals and a compound having the formula defined in claim 1, where X is

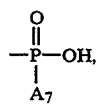

where $R_1$ is a divalent radical selected from straight or branched alkylenes of one to twelve carbon atoms, $A_7$ is alkyl of 1 to 10 carbon atoms, hydroxy, alkoxy of one to ten carbon atoms, alkoxyalkoxy of two to ten carbon atoms and alkanoyloxy of two to ten carbon atoms, or halogen, and all other components are as defined in claim 1.

7. A composition according to claim 5, wherein the $D_1$ is either —O— or —NH—, and wherein the $D_2$ and $D_3$ are each —O—.

8. A composition according to claim 5, wherein the $R_3$ is an acrylic polymeric backbone.

9. A composition according to claim 8, wherein the molecular weight of the acrylic polymeric backbone is from 2000 to 50,000.

10. A composition according to claim 5, wherein the m is from 20 to 50 and the n is from 40 to 70.

11. A composition according to claim 5, wherein the $R_5$ is hydrogen and the $R_6$ is methyl.

12. A composition according to claim 5, wherein j and k are each independently from 1 to 10.

13. A composition according to claim 5 wherein $R_4$ is —CH$_2$CH$_2$CH$_2$CH$_2$CH$_2$—.

14. A composition, comprising a polymeric network; wherein the polymeric network comprises a residue of a compound according to claim 1 and the metal surface modified with the compound.

15. A composition according to claim 14, wherein the metal is a metallic flake pigment.

16. A method for producing a metallic flake pigment surface modified with at least one compound as described in claim 1, comprising mixing the metallic flake pigment with the compound wherein the compound is first dissolved in an organic solvent before mixing with the metallic flake pigment.

17. A method according to claim 16, wherein the metallic flake pigment is aluminum pigment.

18. A method according to claim 16, wherein the organic solvent is a glycol ether or a glycol ether acetate.

19. A method of making an aqueous composition, comprising the steps of
    A. Producing a metallic flake pigment surface modified with at least one compound as described in claim 1, by mixing the metallic flake pigment with the compound;
    B. Combining the surface-modified metallic flake pigment, water, and at least one water-compatible polymer.

* * * * *